FLOWSHEET OF CHLOR-PHOSPHATE PROCESS FOR REACTING POTASSIUM AMALGAM, PHOSPHORIC ACID, AND WATER

EXPLORATORY BENCH-SCALE BATCH
CHLOR-PHOSPHATE SYSTEM

SEMI-CONTINUOUS CHLOR-PHOSPHATE SYSTEM

BENCH-SCALE CHLOR-PHOSPHATE SYSTEM

DECOMPOSER

United States Patent Office 3,832,154
Patented Aug. 27, 1974

3,832,154
PRODUCTION OF CHLORIDE-FREE
POTASSIUM PHOSPHATES
Travis P. Hignett, Sheffield, and Anthony J. Smith, Florence, Ala., assignors to Tennessee Valley Authority
Continuation-in-part of application Ser. No. 296,296, Oct. 10, 1972. This application June 18, 1973, Ser. No. 370,980
Int. Cl. C01d 11/00; C05b 7/00
U.S. Cl. 71—34                                           5 Claims

ABSTRACT OF THE DISCLOSURE

A process for the production of chloride-free potassium phosphate fertilizers, chlorine and hydrogen, including a method of treatment of impure saturated potassium chloride solution wherein a pure or impure brine is electrolyzed at high current efficiency. Chlorine is formed at the anode and potassium amalgam, at the cathode. Said amalgam is subsequently reacted with orthophosphoric acid or polyphosphoric acid solution and water to produce hydrogen and potassium orthophosphate or potassium polyphosphate solution, solids, and solution with solids; or amalgams of other metals, such as sodium, lithium, and zinc are produced at high current efficiency from their respective similarly treated impure chloride brines for subsequent processing.

---

The invention herein described may be manufactured and used by or for the Government for governmental purposes without the payment to us of any royalty therefor.

This application is a continuation-in-part of our copending application Ser. No. 296,296, filed Oct. 10, 1972, for Production of Chloride-Free Potassium Phosphates.

Our invention relates to an improved process for the production of potassium phosphates, potassium hydrogen phosphates, mixtures thereof, and solutions thereof, said phosphates including both orthophosphates and condensed phosphates and derived from the electrolysis of potassium chloride to form potassium amalgam which in turn is reacted with phosphoric acid. A second embodiment of our invention relates to a brine treatment which permits the electrolysis of impure sodium or potassium chloride solution in a mercury cell to produce amalgam at a high current efficiency.

The term "phosphoric acid" used in the specifications and claims is defined as orthophosphoric acid or any mixture of orthophosphoric and condensed (poly-) phosphoric acids; the general formula $H_{n+2}P_nO_{3n+1}$, and the corresponding oxide formula $$[(n/2)P_2O_5+(n+2)/2H_2O],$$

$n$ being the number of phosphorus atoms in the linear molecule, are applicable. The potassium phosphates of phosphoric acid have the general formula

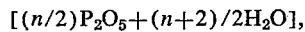

and the corresponding oxide formula

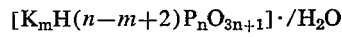

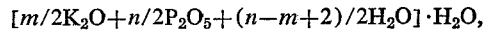

$l$ being the number of molecules of water of hydration (rather than water of constitution), and $m$ being the number of atoms of potassium in the molecule.

The chloride present in potassium chloride is useless in agriculture, and for some crops and soils it is highly objectionable; on the other hand, however, potassium phosphates and potassium hydrogen phosphates are excellent high-analysis, chloride-free fertilizers. The orthophosphates and the short-chain condensed phosphates are very soluble and deliquesce. Although the solubilities in the system $K_2O$-$P_2O_5$-$H_2O$ of mixtures of the orthophosphates and the short-chain phosphates have not been established, the solubilities of potassium orthophosphates (J. R. Van Wazer, "Phosphorus and Its Compounds," Vol. 1, p. 496, Interscience Publishers, Inc., New York, N.Y., 1958) serve as a guide and show that at 50° C. liquids containing as much as 70 percent plant food can be obtained. The same reference (page 496) states that mixing orthophosphates with pyrophosphates increases the solubilities of the potassium phosphates. It was also reported [Frazier, A. W., Scheib, R. M., and Lehr, J. R., *Agricultural and Food Chemistry*, 20, 146–50 (1972)] that the solubilities of mixtures of potassium ortho- and pyrophosphate were greater than those of the orthophosphates alone. And it was also reported [Farr, T. D., and Williard, J. W., *Journal of Chemical Engineering Data*, 16, 67–8 (1971)] that mixtures of ammonium ortho-, pyro-, and tripolyphosphates are more soluble than mixtures of ortho- and pyrophosphates, which, in turn, are more soluble than orthophosphates alone. Thus, even at 0° C., stable or metastable liquids containing approximately 70 percent plant food as $K_2O$ and $P_2O_5$ can probably be obtained. Further, if desired, water can be evaporated from these liquids or from solid potassium phosphates separated therefrom to produce solid potassium phosphate fertilizers of even greater plant-food content.

Potassium phosphates may be made by reaction of potassium chloride with phosphoric acid, but the reaction is incomplete except at high temperatures. A byproduct of the reaction is hydrogen chloride or hydrochloric acid which is very corrosive and presents difficult disposal problems. Even if neutralized with limestone, the resulting calcium chloride is difficult to dispose of without pollution of surface or ground waters. While hydrochloric acid has some industrial uses, its value is low, and the cost of transportation often exceeds its value. It may be noted that Belgium Pat. 739,119 claims an economic process whereby potassium chloride reacts with excess sulfuric acid, and the resulting slurry reacts with phosphate rock to produce a fertilizer-grade potassium phosphate. Coproducts are hydrochloric acid and phosphoric acid; byproducts are calcium sulfate and fluorine compounds.

Potassium phosphates may be produced by reaction of phosphoric acid with potassium carbonate or hydroxide, but the cost of these potassium compounds is so high that these processes have only limited usefulness for fertilizer purposes. Further, a 50-percent potassium hydroxide solution, concentration commonly produced, is capable of reacting with phosphoric acid to produce fertilizer liquids of less than 55 percent plant food unless evaporation of water can be justified. Although potassium metal would react directly with phosphoric acid to produce chloride-free potassium phosphates, such a process would be uneconomic and difficult to control.

Alkali metal polyphosphates have been used in electrolytic processes to limit corrosion of the anode (Ger. Offen. 1,928,748; 1,957,162) and in an electrolytic process to clean copper alloy (Ger. Offen. 1,919,365). Sodium polyphosphate has been used in galvanic cells to improve the electrical characteristics of an electrolyte containing $NH_4Cl$ and $HgCl_2$ (U.S.S.R. 208,781). Phosphoric acid has been used in the alkaline electrolysis of sea water or brine in a diaphragm cell for the simultaneous production of chlorine and solid phosphatic fertilizer containing calcium, magnesium, potassium, and sodium phosphates (Japan 70/37,051; British 1,247,198).

In the amalgam process for the production of caustic and chlorine, an aqueous solution of a chloride salt is electrolyzed. Chlorine gas is evolved at the anode and the metal of the salt is deposited on a flowing mercury cathode. The metal dissolves in the mercury, forming an amalgam which is drained from the electrolysis cell. Hence the electrolysis of potassium chloride produces potassium amalgam; potassium as amalgam is less expensive than potassium metal. A comprehensive review of the uses that are put to such amalgams is reported by Robert B. MacMullin in *Chemical Engineering Progress*, 46, No. 9, 440-55 (September 1950). Probably the principal use of potassium amalgam is by chlor-alkali plants in production of potassium hydroxide by reaction with water; graphite or other short-circuiting material is required in the decomposer to make the reaction proceed.

We have now discovered a simplified method of preparing chloride-free potassium phosphates; several new and advantageous features over the processes shown in the prior art are realized by the present invention. Among these advantageous features are: a process which (1) is convenient for preparing and handling potassium phosphates; (2) is relatively simple and convenient for permitting the production of a composition or compositions of matter which are not now available on a commercial basis, but which are very suitable for use as high-analysis fertilizers and as components in mixed fertilizers; (3) utilizes commercially available raw materials; (4) produces a valuable coproduct, chlorine, and byproduct, hydrogen, of commercial importance; (5) produces chlorine without the constraint of the production of coproduct caustic; (6) obviates the requirement of the use of graphite or other short-circuiting material presently needed for the reaction of amalgam with water; and (7) permits the electrolysis of impure brine in a mercury cell, yet achieves a high current efficiency for the production of amalgam.

It is therefore an object of the present invention to produce economically, simply, and directly potassium phosphates as concentrated aqueous solution, or as mixture of solution and solids, or as mixture of solution and mixture of solids, or as particular phosphate, or as a mixture of particulate phosphates, all essentially free of chlorine.

Another object of the present invention is the economical, simple, and direct production of potassium phosphates by a process which utilizes commercially available, relatively inexpensive and well-known chemicals as raw materials.

Still another object of the present invention is the production of a valuable coproduct, chlorine, and of a valuable byproduct, hydrogen with the hydrogen available for sale or for such in-plant use as the production of ammonia A further object of the present invention is the elimination of the constraint imposed when potassium is amalgamated and reacted with water: coproducts are chlorine and caustic; the marketing outlook for each product within a given region seldom matches production of both products.

A still further object of the present invention is the elimination of the necessity of reacting the amalgam in a short-circuited decomposer packed with graphite.

Another object of the present invention is the preparation of potassium phosphate solutions more concentrated than those it is possible to prepare without evaporation of water by reacting commercial 50 precent caustic with phosphoric acid.

Another object of the present invention is the economic electrolysis of sodium chloride or potassium chloride solutions containing greater concentrations of impurities than can normally be tolerated in a mercury cell.

In carrying out the objects of our invention in one form thereof, we electrolyze potassium chloride solution in a conventional mercury-cathode cell and produce chlorine and potassium amalgam which are removed from the cell. The amalgam flows into a decomposer where it reacts with suitable proportions of phosphoric acid and water to produce hydrogen gas and a solution of potassium phosphates or a solution with precipitated potassium phosphate solids. The precipitated solids can be separated as product, or a mixture of solution and precipitated solids can be removed as product, or a solution with no precipitated solids can be removed as product. We have further fround that the reaction rate of the amalgam with the acid and water is so great that it is unnecessary to use graphite or other short-circuiting material in the decomposer to accelerate the reaction as is the prior art practiced in the chlor-alkali industry. We have also found that the reaction will take place at a controllable and convenient rate in an acid, a neutralized or an over-neutralized solution (pH 10 or below), permitting production of a product of desired acidity simply by suitably proportioned admixture of reactants. In addition, we have found that when the reaction is adequately controlled the distribution of phosphate species is essentially unchanged when the reactant acid is converted to phosphate product.

In another form of carrying out the objects of our invention, we electrolyze either sodium chloride or potassium chloride solution containing a greater concentration of impurities than can normally be tolerated in a mercury cell, yet obtain high current efficiencies for the production of sodium or potassium amalgam.

Still further and more general objects and advantages of the present invention will appear from the more detailed description set forth below, it being understood, however, that this more detailed description is given by way of illustration and explanation only and not by way of limitation, as various changes therein may be made by those skilled in the art without departing from the spirit and scope of the present invention.

Our invention, together with further objects and advantages thereof, will be better understood from a consideration of the following description taken in connection with the accompanying drawings in which.

Figure 1:
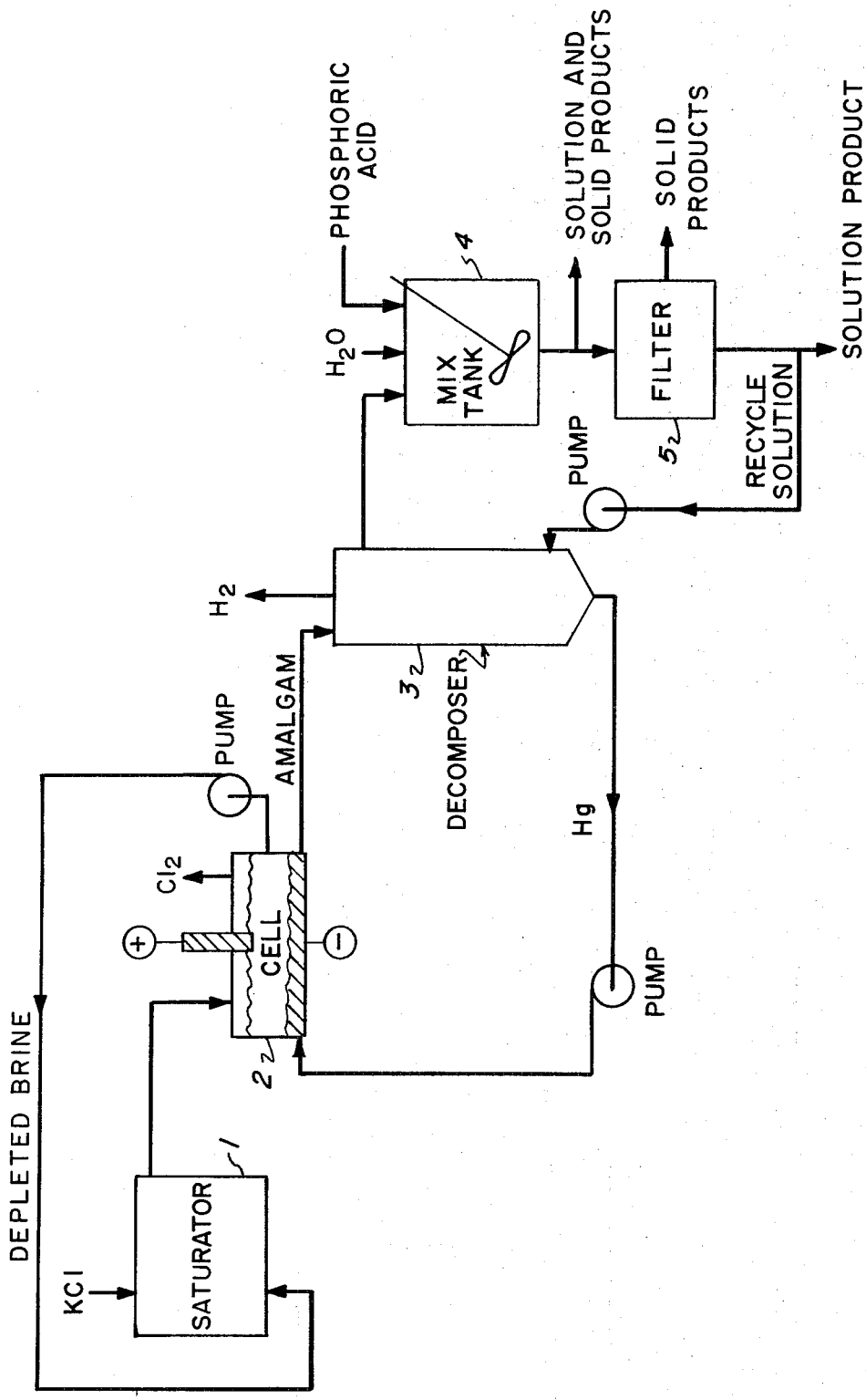
FIG. 1 is a flowsheet illustrating the principles utilized in carrying out our invention.

Referring now specifically to FIG. 1, solid potassium chloride and depleted brine are fed to saturator 1 and the resulting brine is sent to cell 2 where is is electrolyzed. Chlorine is produced at an inert anode, potassium is amalgamated by a mercury cathode, and the amalgam flows into decomposer 3 where the potassium reacts with a recycle potassium phosphate solution, producing hydrogen and a mixture of phosphate solution and solids or a phosphate solution enriched with $K_2O$ and depleted in $H_2O$. The solution or solution with solids is fed into a mix tank 4 where phosphoric acid and water are added in suitable proportions. Solutions and solids are removed as mixed products or are separated by filter 5 if a solid product is desired. A solution product can also be extracted, or if no solids are formed in decomposer 3 or mix tank 4, only a solution product is withdrawn. Mercury, stripped of potassium, is pumped from decomposer 3 to cell 2; depleted brine is pumped from cell 2 to saturator 1.

Figure 2:
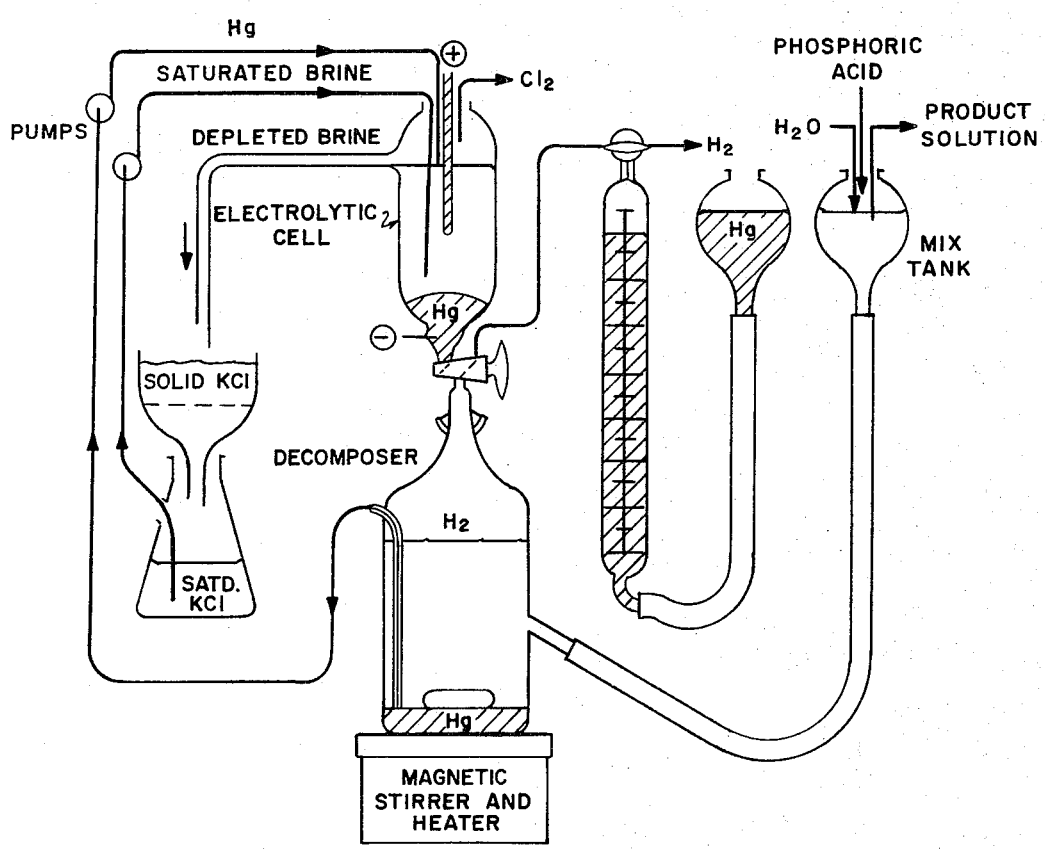
FIG. 2 is a diagram of the equipment we have used on exploratory bench-scale batch-tests of our process.

Referring now specifically to FIG. 2, there is shown a diagram of equipment we used on tests of a scale smaller than that of a commercial plant and of a size generally referred to as exploratory bench scale. As may be seen, the solid potassium chloride and depleted brine solution were fed to a saturator, operated at room temperature, and the resulting brine was pumped into the electrolytic cell where a current was passed between a graphite anode and a stagnant pool of mercury, manufacturing chlorine at the anode and potassium amalgam at the cathode.

Depleted brine flowed back to the saturator and the amalgam was drain immediately into the decomposer which contained a neutral potassium phosphate solution of nominal 0-28-28 fertilizer grade (0 percent N, 28 percent $P_2O_5$, 28 percent $K_2O$). The reaction produced hydrogen which was collected, measured, and discharged. Water and phosphoric acid were added in the mix tank, and a nominal 0-28-28 liquid product was removed therefrom. Mercury that collected in the bottom of the decomposer was pumped back into the cell so that the cycle could be repeated.

Figure 3:
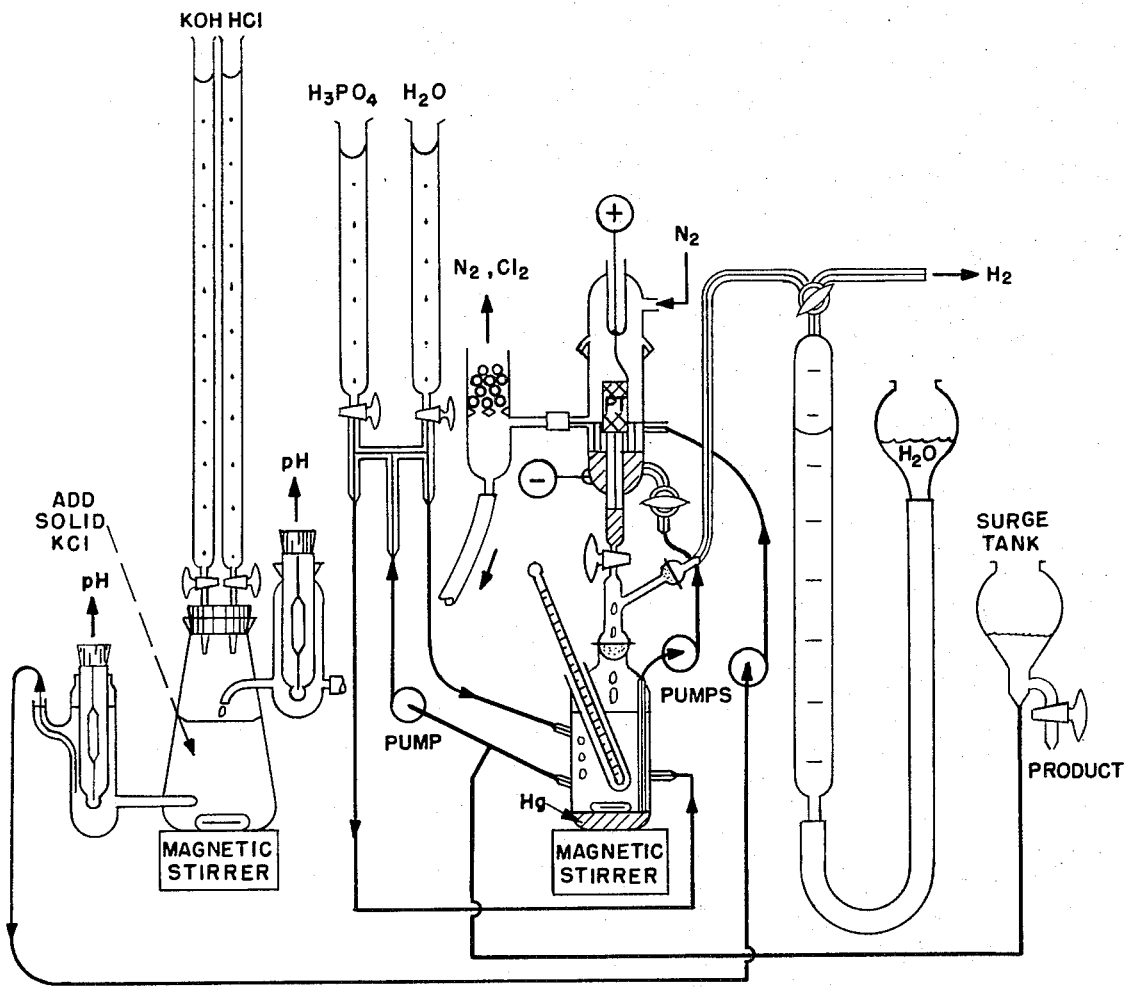
FIG. 3 is a diagram of the equipment we have used on semi-continuous tests of our process.

Referring now more specifically to FIG. 3, there is shown a diagram of equipment we used on tests of a scale smaller than that of a commercial plant and of a size generally referred to as bench scale. As may be seen, the solid potassium chloride and depleted brine were fed to a saturator operated at ambient temperature. The acidity of the brine was monitored at the inlet and outlet of the saurator and appropriate adjustments were made by the addition of KOH or HCl solutions. The brine was pumped into the cell and a current was passed between a platinum-gauze anode and a flowing mercury cathode. Clorine was manufactured at the anode, potassium amalgam at the cathode. The amalgma drained constantly into the decomposer where it was stripped of potassium and was pumped continuously as essentially pure mercury back to the cell. Brine was not allowed to enter the decomposer. Potassium phosphate solution was pumped from the decomposed, mixed in separate streams with appropriate portions of water and with phosphoric acid, which were added intermittently and returned by separate lines to the decomposer. This arrangement minimized degradation of the longer chain-length phosphate species. Nitrogen was mixed with the chlorine that was manufactured, in order to lessen the likelihood of creating explosive mixtures of chlorine and hydrogen in the experimental arrangement; in a commercial plant, nitrogen contamination of the chlorine would not be desired. Hydrogen manufactured in the decomposer was measured in a eudiometer, then discharged. Product potassium phosphate solution was withdrawn from the surge tank.

Figure 4:
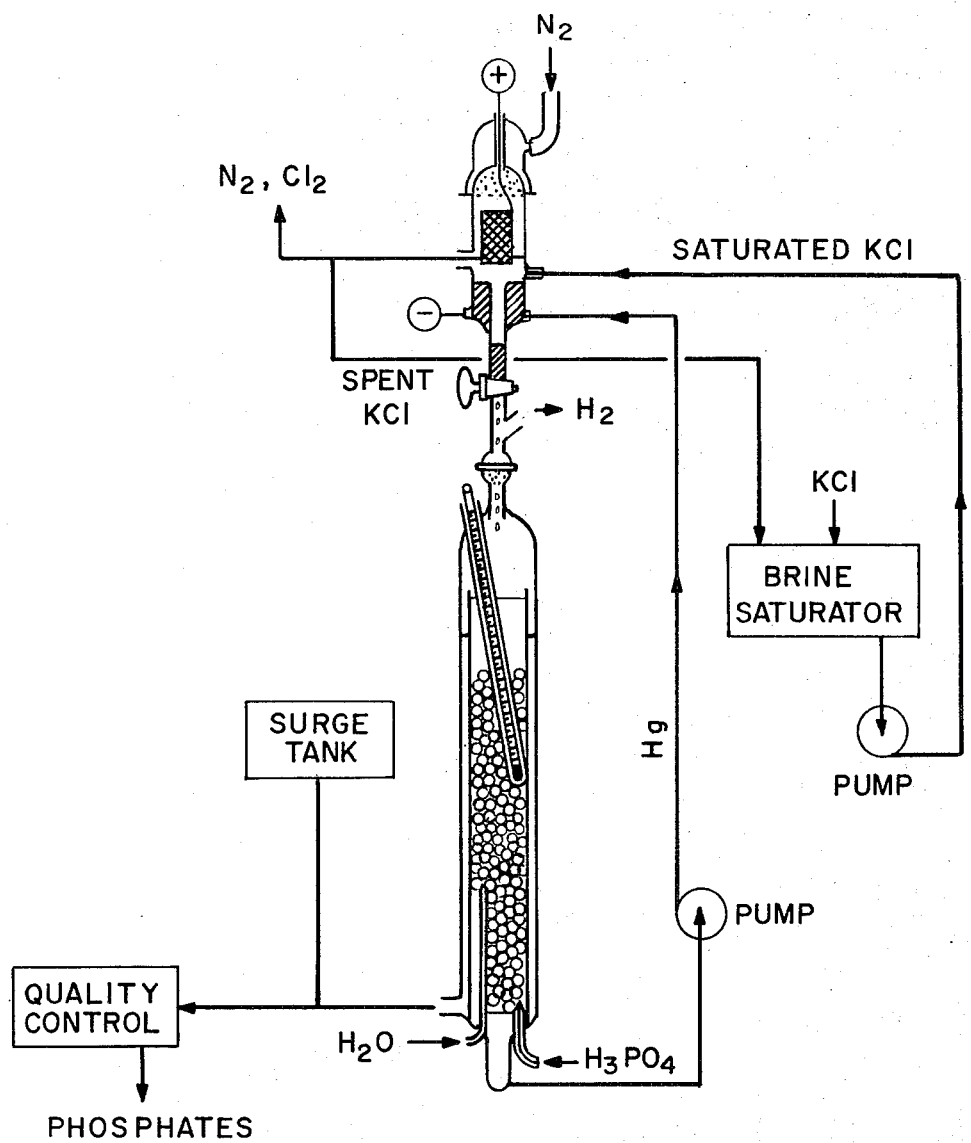
FIG. 4 is a diagram of the equipment we have used on larger, bench-scale continuous tests of our process.

Referring now specifically to FIG. 4, there is shown a diagram of equipment we used on tests of a scale smaller that that of a commercial plant and of a size generally referred to as bench scale. As may be seen, the solid potassium chloride and depleted brine were fed to a saturator operated at ambient temperature, the acidity of the brine was monitored at the inlet and outlet of the saturator, and appropriate adjustments were made. The brine was pumped into the cell and a current was passed between a platinum gauze and a flowing mercury cathode. Chlorine was manufactured at the anode, amalgam was produced at the surface of the flowing cathode and drained continuously into the decomposer where it was stripped of potassium and was pumped continuously as essentially pure mercury back to the cell. The resulting phosphate solution or solution with solids overflowed the central well of the decomposer and drained into a quality control unit where the density and pH were monitored as the product was withdrawn. The product also branched to a surge tank. Flowmeters monitored the rates of flow of water and phosphoric acid into the decomposer (burettes measured accumulated flow), the acid entering the lowest level and the water at an intermediate level. This arrangement eliminated the need for a mix tank, minimized degradation of phosphate chain-length, improved circulation within the decomposed, and prevented unwanted formation of solid potassium phosphates within the decomposer. The temperature of the phosphate solution in the decomposer was monitored with a thermometer placed in a thermometer well. Nitrogen was introduced into the cell where it mixed with chlorine, as the latter was manufactured, in order to minimize the likelihood of creating explosive mixtures of chlorine and hydrogen in the experimental arrangement; in a commercial plant, nitrogen contamination of the chlorine would not be desired. Hydrogen manufactured in the decomposer was passed through an entrainment collector and was delivered to alternate eudiometers where it was measured, then discharged. The use of alternate eudiometers avoided buildup of hydrogen pressure during discharge of the hydrogen.

Figure 5:
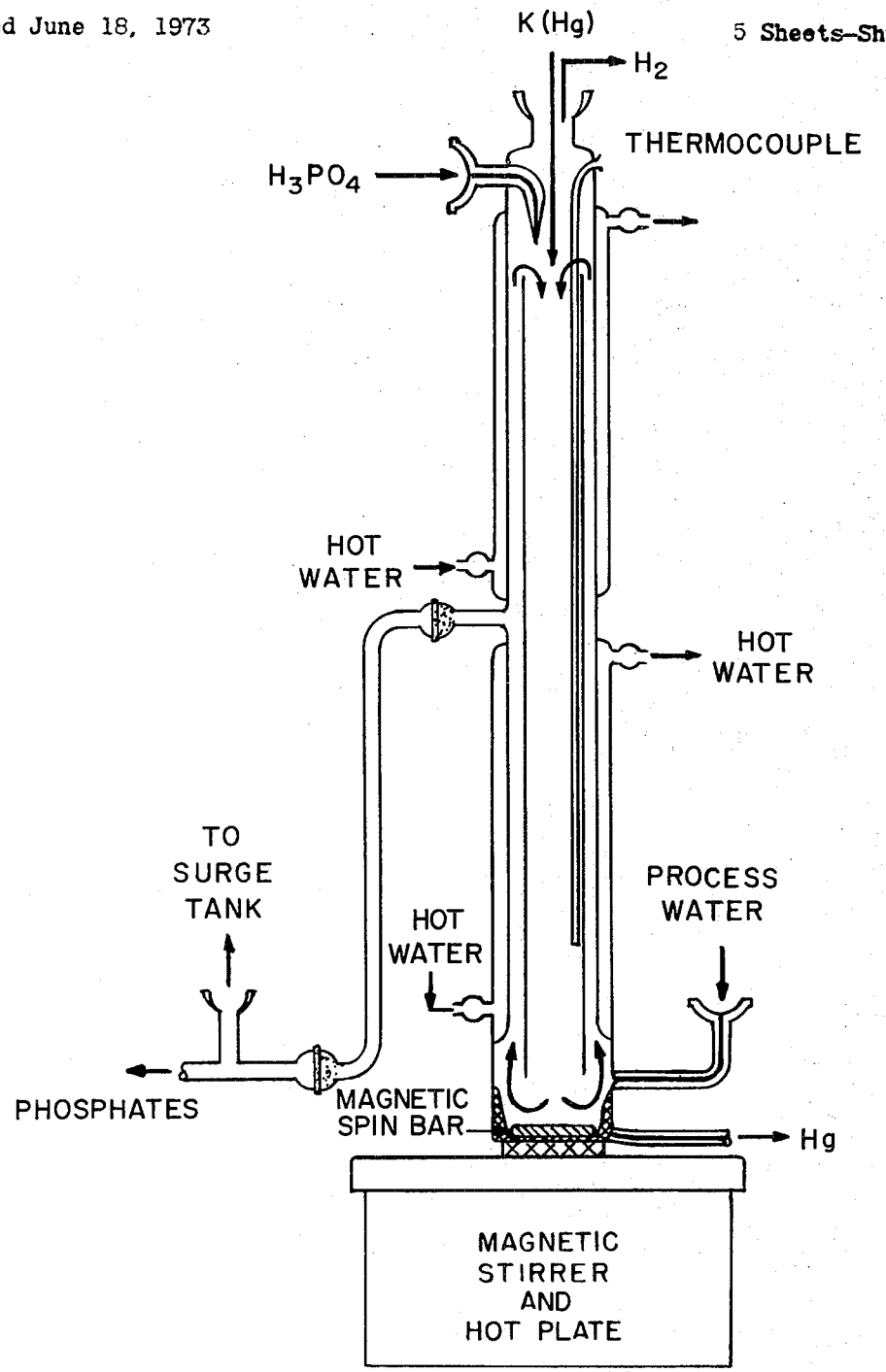
FIG. 5 is an illustration of a reactor used in conjunction with additional bench-scale continuous tests of our process.

Referring now specifically to FIG. 5, there is shown a diagram of the decomposer that we substituted for the decomposer shown in FIG. 4, supra. This one employed a magnetic spin-bar which served as an agitator and circulator. Introduction of water and phosphoric acid directly into the decomposer eliminated the need for a mix tank. The absence of glass beads or other packing material permitted the formation of phosphate solids, allowing the production of liquids or slurries without obstructing flow of product to the quality control unit. The temperature of the phosphate solution in the decomposer was monitored by a thermocouple placed in a thermocouple well; the temperature was controlled by circulating heated water through jackets around the decomposer.

In order that those skilled in the art may better understand how the present invention can be practiced and more fully and definitely understood, the following examples of processes that we have used in the preparation for the production of potassium phosphate compounds prepared according to our invention are given by way of illustration and not by way of limitation.

EXAMPLE I

The decomposer (FIG. 2) was a 250-ml. borosilicate-glass bottle, 2.5 inches I.D. by 5.5. inches long fitted with a ground joint for attachment to the electrolytic cell. A batch of potassium amalgam (about 100 g.; 0.003 g. K/g. Hg), manufactured by the passage of 6.0 amperes of electrically for 126 seconds during the electrolysis of saturated potassium chloride solution pumped at 900 ml./hr. by the action of a peristaltic pump upon Tygon tubing, was drained immediately into 500 g. of nominal 0-28-28 potassium phosphate solution. This solution, prepared from potassium hydroxide pellets, water, and 105 percent phosphoric acid, had an actual composition of 28.1 percent $P_2O_5$ and 27.3 percent $K_2O$, was stirred with a magnetic stirrer, and could be heated if desired. The reaction was essentially complete at 25° C. in 17 minutes. Hydrogen gas was manufactured and delivered to a 100-ml. eudiometer where a volume of 87 ml., corrected to standard temperature and pressure, was collected. This corresponded to the reaction of 0.30 g. of potassium produced by the cell's operating at 99 percent current efficiency. The collected hydrogen was discharged, the mercury, stripped of potassium, was pumped back into the electrolytic cell, and a similar cycle was repeated 9 times. After the addition of 4.9 g. of 105 percent $H_3PO_4$ and 5.4 g. of $H_2O$ to the phosphate solution, a product weighing 13.4 g. had been manufactured. It had the identical composition of the initial phosphate solution; the density was 1.63 g./ml. at 25° C. and the pH was 7.02. The phosphate species distribution was: ortho, 55 percent; pyro, 39 percent; tripoly, 5 percent; and other, 0.4 percent. This distribution was the same as that of the original 0-28-28 mix.

EXAMPLE II

The decomposer (FIG. 3) was a 250-ml. borosilicate-glass bottle into which a thermometer well was built so that the temperature of the decomposition-reaction could be followed. The electrolytic cell incorporated a well into which freshly formed potassium amalgam flowed continuously into the decomposer. Mercury or amalgam that collected in the bottom of the decomposer was pumped back to the cell. In one set of tests, the decomposer was charged with 400 g. of distilled water; the brine, mercury, and water were pumped at 900 ml./hr. by the action of peristaltic pumps on Tygon tubing, and a current was passed through the brine. Hydrogen that was manufactured was delivered to a 100-ml. eudiometer, but because the decomposer did not contain graphite to accelerate the rate of decomposition, the reaction between the amalgam and the water was so slow that after an hour only 5 ml. of hydrogen had been manufactured although enough potassium had been amalgamated to manufacture more than a liter of hydrogen. The calculated pH was 11. When 2 g. of 105 percent $H_3PO_4$ was added, a vigorous reaction took place, as evidenced by the rapid evolution of hydrogen. In 12 minutes, 269 ml. of hydrogen, corrected to standard temperature and pressure, was collected. Thereafter, $H_3PO_4$ was added intermittently at such a rate as to approximate a $K_2O/P_2O$ weight ratio of 1.1 within the decomposer. As the electrolysis continued, appropriate additions of KOH or HCl to the brine were made to maintain the desired acidity. Typical operational temperatures attained in the system when the current was 11 amperes were: decomposer, 50° C.; brine saturator, 40° C.; and cell-brine, 70° C. The data which were acquired from th ensuing tests are shown in Tables I and II below; these data demonstrate that the phosphate solution is effective in decomposing amalgam and that, as the concentration of the phosphate increased, the distribution of species was maintained.

TABLE I
[Electrolysis of pure KCl solution in a mercury cell]

| Run No. | Current, amperes | Charge, coulombs | Hydrogen collected, ml. (STP) | Theoretical hydrogen ml. (STP) | Current efficiency, percent |
|---|---|---|---|---|---|
| 1 | 1-5 | 42,780 | 3,392 | 4,969 | 68 |
| 2 | 5-7 | 41,700 | 4,413 | 4,843 | 91 |
| 3 | 6 | 36,720 | 3,452 | 4,265 | 81 |
| 4 | 10 | 121,800 | 14,296 | 14,147 | 101 |
| 5 | 10-12 | 60,720 | 7,225 | 7,053 | 102 |
| 6 | 11 | 104,360 | 12,132 | 12,122 | 100 |
| Total | | 408,080 | 44,910 | 47,399 | 95 | umn 20 inches long with a central reactor column, filled with glass beads, into which water, phosphoric acid, and potassium amalgam were continuously introduced after an initial charge of pure water. The brine and the mercury were separately pumped at 900 ml./hr. and current was passed through the brine. Amalgam continuously drained into the decomposer and potassium phosphate solution was produced, overflowed the central reactor column, and drained into the quality control unit where the pH and density were monitored. The pH of the liquid is a measure of the ratio $K_2O: P_2O_5$; it was raised either by increasing the amount of current in the electrolytic cell or by decreasing the rate at which phosphoric acid was added. Depending upon the product desired, the operating range of pH is 0-14, but the preferred range is 5-10. Operation at pH 5 or below causes hydrolysis of polyphosphates to orthophosphates; operation at pH 10 or above slows the rate of decomposition of potassium amalgam, and requires a short-circuited decomposer as is used in amalgam chlor-alkali plants. Limited information on solubilities of mixtures of potassium phosphates suggests that the maximum solubilities will be in the pH ranges 6-10, corresponding to ratios of $K_2O:P_2O_5$ of 0.9-1.3, respectively. The density is a measure of the total plant food and was controlled by the rate of addition of water to the decomposer. Projections show that densities of pure solution range as high as 1.9 g./ml. at 25° C. for 70 percent total plant food. Such solutions would have a high order of stability even though some may be supersaturated. The data which were accumulated from the tests are shown in Tables III and IV below. During the first three runs, 104.9 percent $H_3PO_4$ (76 percent $P_2O_5$) furnace acid was used. For the other runs the acid was 108.1 percent $H_3PO_4$ (78.3 percent $P_2O_5$) made from a mixture of furnace acid and clarified wet-process acid. The phosphate product was a clear colorless liquid.

TABLE II
[Potassium phosphate production]

| Cumulative ampere-hours | $P_2O_5$, percent | $K_2O$, percent | $K_2O:P_2O_5$ weight ratio | Phosphate species distribution, percent | | | | pH | Density, g./ml. at 25° C |
|---|---|---|---|---|---|---|---|---|---|
| | | | | Ortho | Pyro | Tripoly | Other | | |
| 33.7 | 12.4 | 13.1 | 1.06 | 55.7 | 36.0 | 6.8 | 1.6 | — | 1.23 |
| 84.4 | 22.3 | 23.1 | 1.04 | 54.9 | 36.6 | 7.0 | 1.5 | 7.2 | 1.48 |
| 113.4 | 25.3 | 26.9 | 1.06 | 54.7 | 35.4 | 8.5 | 1.3 | 7.4 | 1.58 |

EXAMPLE III

The decomposer (FIG. 4) was a borosilicate-glass col-

Only the primer and the liquids from runs 1 through 3 where the polyphosphate content was less than 35 percent developed crystals upon standing at room temperature.

TABLE III
[Electrolysis of pure KCl solution in a mercury cell]

| Run No. | Current, A | Time, hr. | Total charge, Ah | Average current, A | Hydrogen, liters | | | Current efficiency, percent |
|---|---|---|---|---|---|---|---|---|
| | | | | | RTP | STP | Theoretical, STP | |
| 1 | 2-14 | 6.60 | 73 | 11.1 | 33.7 | 29.7 | 31 | 96 |
| 2 | 8-14 | 6.83 | 80 | 11.7 | 34.1 | 30.1 | 33 | 91 |
| 3 | 6-14 | 8.20 | 97 | 11.8 | 43.2 | 38.0 | 41 | 93 |
| 4 | 12 | 7.40 | 89 | 12.0 | 23.9 | 21.0 | 37 | 57 |
| 5 | 4-16 | 6.80 | 82 | 12.1 | 23.2 | 20.4 | 34 | 60 |
| 6 | 9-14 | 7.58 | 87 | 11.5 | 24.8 | 21.7 | 36 | 60 |
| 7 | 12-14 | 7.75 | 100 | 12.9 | 44.4 | 38.2 | 42 | 91 |
| 8 | 13-15 | 8.25 | 115 | 13.9 | 50.8 | 44.5 | 48 | 93 |
| 9 | 12-16 | 8.27 | 115 | 13.9 | 51.3 | 45.5 | 48 | 95 |
| 10 | 5-17 | 6.70 | 89 | 13.3 | 36.0 | 31.5 | 37 | 85 |
| Total | | 74.38 | 927 | 12.5 | 365.4 | 320.6 | 388 | 83 |

TABLE IV

[Potassium phosphate production]

| Run No. | Weight, g. | Composition, | | | P.p.m. Hg | Weight ratio, $K_2O:P_2O_5$ | Phosphate species distribution, percent of total P | | | | pH at 25° C. | Density, g./ml. at 25° C. |
|---|---|---|---|---|---|---|---|---|---|---|---|---|
| | | $P_2O_5$ | $K_2O$ | $Cl_2$ | | | Ortho | Pyro | Tripoly | Other | | |
| Primer solution | 1,038 | 27.6 | 28.2 | 0.01 | 0.01 | 1.022 | 60.1 | 37.2 | 2.1 | 0.5 | 7.22 | 1.637 |
| 1 | 695 | 27.5 | 27.9 | 0.04 | 0.01 | 1.015 | 60.0 | 36.3 | 3.0 | 0.7 | 7.14 | 1.625 |
| 2 | 541 | 23.5 | 23.5 | 0.01 | 0.12 | 1.000 | 58.9 | 37.3 | 2.9 | 1.0 | 6.60 | 1.504 |
| 3 | 513 | 21.8 | 24.8 | 0.66 | 0.01 | 1,138 | 64.9 | 30.8 | 3.4 | 0.9 | 7.44 | 1.505 |
| 4 | 297 | 23.5 | 26.3 | 0.59 | 0.01 | 1.119 | 57.9 | 34.2 | 6.6 | 1.3 | 7.53 | 1.553 |
| 5 | 309 | 25.1 | 26.9 | 0.60 | 0.13 | 1,072 | 45.3 | 39.1 | 12.4 | 3.2 | 7.33 | 1.578 |
| 6 | 289 | 25.5 | 27.5 | 0.53 | 0.15 | 1.078 | 40.7 | 40.2 | 14.9 | 4.2 | 7.45 | 1.594 |
| 7 | 651 | 24.6 | 27.2 | 0.90 | 0.63 | 1,106 | 37.2 | 40.9 | 16.9 | 5.0 | 7.45 | 1.576 |
| 8 | 659 | 25.4 | 27.2 | 0.89 | 0.20 | 1.071 | 30.1 | 43.4 | 19.4 | 7.0 | 7.24 | 1.588 |
| 9 | 568 | 26.7 | 28.2 | 0.59 | 0.18 | 1.056 | 28.4 | 43.9 | 20.4 | 7.3 | 7.39 | 1.616 |
| 10 | 481 | 28.8 | 28.7 | 0.38 | 0.19 | 0.997 | 29.4 | 45.3 | 19.4 | 5.9 | 7.14 | 1.660 |
| Heel | 960 | 26.2 | 29.0 | 0.32 | 0.27 | 1.107 | 26.8 | 45.1 | 20.6 | 7.4 | 7.93 | 1.634 |

EXAMPLE IV

The borosilicate-glass decomposer (FIG. 5) employing a magnetic agitator-circulator was substituted for the one shown in FIG. 4, supra. Amalgam and phosphoric acid were fed at the top and water was fed near the bottom. The mercury and the brine were separately pumped at 1800 ml./hr. Hot water introduced into jackets fixed the decomposition temperature at 70° C. The feed acids employed were wet-process acids prepared from calcined North Carolina phosphate rock; these acids had a 2 percent metallic contamination and were green in color. The results are shown in table V below. The products were slurries which, upon settling, consisted of a pale green solution and solids consisting primarily of $$(Al,Fe)PO_4 \cdot xH_2O$$

and $Mg_2KH(PO_4)_2 \cdot 15H_2O$. Wet solids constituted about 10 percent of the production during the first 8 runs when 75 percent $H_3PO_4$ (54 percent $P_2O_5$) was used, but only about 1 percent of the production during the last 2 runs when 99 percent $H_3PO_4$ (72 percent $P_2O_5$) was used. The phosphate in the former acid was 0 percent polyphosphate whereas that in the latter was 48 percent polyphosphate. Unwanted solids could be avoided by mixing the impure wet-process polyphosphoric acid with pure furnace polyphosphoric acid.

TABLE V

[Potassium phosphate production]

| Run No. | Weight of products, g. | | Solution | | | | | |
|---|---|---|---|---|---|---|---|---|
| | Solution | Wet solids | Composition, percent | | Weight ratio, $K_2O:P_2O_5$ | pH | Density, g./ml. at 25° C. | |
| | | | $P_2O_5$ | $K_2O$ | | | | |
| 1 | 501 | 42 | 10.3 | 10.5 | 1.02 | 6.26 | 1.195 | |
| 2 | 104 | 14 | 16.3 | 19.5 | 1.20 | 7.02 | 1.377 | |
| 3 | 195 | 23 | 19.6 | 24.1 | 1.23 | 7.44 | 1.483 | |
| 4 | 308 | 29 | 21.3 | 25.9 | 1.22 | 7.48 | 1.535 | |
| Heel | 323 | 52 | 21.5 | 25.1 | 1.17 | 7.25 | 1.522 | |
| 5 | 134 | 20 | 17.8 | 21.0 | 1.18 | 7.53 | 1.412 | |
| 6 | 134 | 20 | 22.8 | 26.0 | 1.14 | 7.47 | 1.554 | |
| 7 | 156 | 17 | 22.6 | 26.8 | 1.19 | 7.64 | 1.562 | |
| 8 | 189 | 26 | 21.5 | 26.4 | 1.23 | 7.65 | 1.544 | |
| Heel | 338 | 40 | 21.3 | 26.3 | 1.23 | 7.67 | 1.545 | |
| 9 | 142 | 2 | 22.1 | 24.7 | 1.12 | 7.69 | 1.522 | |
| 10 | | | 26.8 | 29.3 | 1.09 | 7.88 | 1.659 | |
| Heel | 204 | 2 | 26.8 | 29.3 | 1.09 | 7.88 | 1.659 | |

EXAMPLE V

The system described in Example IV, supra, was employed. The feed acid was very concentrated electric furnace polyphosphoric acid (80 percent $P_2O_5$). The results are shown in Table VI below. The concentrated potassium polyphosphate solution that was produced contained 63 percent plant food ($P_2O_5$ percent+$K_2O$ percent) and was a stable liquid when stored at room temperature. The $P_2O_5$ was 73.1 percent polyphosphate, 26.9 percent orthophosphate.

TABLE VI

Production of Potassium Polyphosphate Solution

Weight, g. ------------------------------------- 535
Composition, percent
  $P_2O_5$ ----------------------------------- 30.9
  $K_2O$ ------------------------------------ 31.1
Weight ratio
  $K_2O:P_2O_5$ ------------------------------ 1.006
pH ------------------------------------------ 7.67
Density, g./ml. at 25° C. -------------------- 1.740

EXAMPLE VI

The system used in Example IV, supra, was employed. The feed acid was reagent grade 85 percent orthophosphoric acid (62 percent $P_2O_5$). The results are shown in Table VII below. The concentrated potassium orthophosphate solution that was produced contained as much as 48 percent plant food ($P_2O_5$ percent+$K_2O$ percent) and was a stable liquid when stored at room temperature. It contained no more than a trace of polyphosphate.

TABLE VII

Production of potassium orthophosphate solutions

| Run No. | Weight, g. | Composition, Percent | | Weight ratio, $K_2O:P_2O_5$ | pH | Density, g./ml. at 25° C. |
|---|---|---|---|---|---|---|
| | | $P_2O_5$ | $K_2O$ | | | |
| 1 | 105 | 17.7 | 18.1 | 1.023 | 7.10 | 1.380 |
| 2 | 295 | 23.6 | 24.7 | 1.047 | 7.49 | 1.555 |
| 3 | 350 | 22.5 | 24.2 | 1.076 | 7.48 | 1.531 |
| Heel | 350 | 22.7 | 24.2 | 1.066 | 7.47 | 1.530 |

EXAMPLE VII

The system employed for Example IV, supra, was used. Very pure brine is normally required in a mercury cell if a high current efficiency for the production of amalgam is to be attained. The usual current efficiency when NaCl is used is 95–97 percent and when KCl is used is 92–94 percent ("Electrolysis of Brines in Mercury Cells," by R. B. MacMullin, page 182 in "Chlorine—Its Manufacture, Properties and Uses." J. S. Sconce, editor, Reinhold Publishing Corporation, New York, 1962). Three grades of potassium chloride were dissolved and electrolyzed in a mercury cell. Brine A was made from a very pure reagent grade KCl; brine B was made from coarse "Higran" KCl; and brine C was made from granular "Red" KCl. Analyses of the solid potassium chlorides are shown in Table VIII.

Some of the brine was treated with orthophosphoric acid (62 percent $P_2O_5$), others, with polyphosphoric acid (80 percent $P_2O_5$). The results are shown in Table IX, infra. Orthophosphoric acid in the concentration range 0.3 to 1.8 percent P and polyphosphoric acid in the concentration range 0.01 to 2.0 percent P were found to have a beneficial effect upon the current efficiency.

TABLE VIII

[Analysis of solid potassium chlorides]

| | | Composition, wt. percent | |
|---|---|---|---|
| | J. T. Baker Chemical Co. reagent-grade | U.S. Borax and Chemical Company | |
| | | 62-63% $K_2O$ coarse "Higran" | 59-61% $K_2O$ granular "Red" |
| Component: | | | |
| KCl | 99.6 | 98.8 | 93.97 |
| $K_2O$ | 62.9 | 62.3 | 59-61 |
| NaCl | 0.008 | 0.94 | 1.8-2.5 |
| KBr | 0.007 | 0.03 | 0.08 |
| $MgSO_4$ | | 0.03 | 0.09 |
| $CaSO_4$ | | 0.02 | 0.08 |
| $K_2SO_4$ | | | 0.17 |
| $PO_4$ | 0.0003 | | |
| $SO_4$ | 0.0005 | 0.03 | 0.15 |
| Al | TR | <0.01 | 0.05 |
| Co | ND | ND | ND |
| Cu | TR | <0.01 | <0.01 |
| Fe | 0.0001 | ND | 0.05-0.10 |
| Mg | <0.001 | 0.05 | 0.2 |
| Mn | <0.001 | <0.01 | <0.01 |
| Ni | ND | ND | ND |
| Si | ND | ND | 0.05 |
| V | ND | <0.01 | <0.01 |
| Ca | ND | <0.01 | <0.01 |
| Cr | ND | ND | ND |
| Na | 0.003 | 0.46 | 0.7-1.4 |
| $H_2O$ | 0.05 | 0.28 | 0.20 |
| Other compounds | | 0.03 | 0.82 |
| pH of saturated solution at 25° C | 5.5 | 8.6 | 10.0 |

NOTE.—TR=trace; ND=not detected by spectrographic analysis.

TABLE IX

[Electrolysis of KCl solutions in a mercury cell]

| Run No. | Brine feed [1] | Brine treatment [2] | Current efficiency, percent |
|---|---|---|---|
| 1b | A | 0 | 98 |
| 2a | A | 0 | 99 |
| 2b | B | 0 | 48 |
| 5c | B | 2 | 97 |
| 2n | C | 1 | 70 |
| 8b | C | 2 | 96 |

[1] A=Reagent-grade KCl; B="Higran" KCl; C="Red" KCl.
[2] 0=No treatment; 1=orthophosphoric acid; 2=polyphosphoric acid.

After combing and panning the data, results, and operations of our new, novel, improved, and unique method for producing chlorine gas, hydrogen gas, and potassium phosphate solution, mixture of solution and solids, mixture of solution and mixture of solids, particulate phosphate, or mixture of particulate phosphates, all phosphates essentially free of chlorine, we now present in Table X below the acceptable and preferred ranges of operating the variables involved when water is saturated with solid potassium chloride, the resulting solution is electrolyzed in a mercury cell to produce chlorine gas and potassium amalgam, and said amalgam is subsequently decomposed in a potassium phosphate solution to which is also added phosphoric acid and water, and from which potassium phosphate and hydrogen gas are produced and mercury is reclaimed.

TABLE X

Production of chloride-free potassium phosphates acceptable and preferred ranges of variables

| Reaction variable | Limits | Preferred |
|---|---|---|
| Saturator temperature, ° C | 25-65 | 50-60 |
| Feed brine pH | 2.5-5.5 | 3.4-4.5 |
| Feed brine temperature, ° C | 40-70 | 50-60 |
| Concentration of potassium chloride in feed brine, g./l | 330-360 | 340-350 |
| Concentration of orthophosphoric acid in brine, percent P | 0.1-2.5 | 0.5-1.0 |
| Concentration of polyphosphoric acid in brine, percent P | 0.01-2.0 | 0.05-0.3 |
| Cathode current density, $A/cm.^2$ | 0.1-3.5 | 0.2-0.7 |
| Anolyte temperature, ° C | 60-90 | 70-80 |
| Anolyte pH | 2.0-4.0 | 2.5-3.5 |
| Concentration of potassium chloride in spent brine, g./l | 250-300 | 270-280 |
| Concentration of potassium in amalgam, weight percent | 0.1-0.5 | 0.20-0.35 |
| Concentration of $P_2O_5$ in acid, weight percent | 30-85 | 50-80 |
| Phosphoric acid temperature, ° C | 10-boiling | 50-60 |
| Process water temperature, ° C | 10-boiling | 25-60 |
| Decomposer temperature, ° C | 35-100 | |
| Acid, 30-70% $P_2O_5$ | | 65-95 |
| Acid, 70-87% $P_2O_5$ | | 50-70 |
| Decomposition pH | 0-14 | 5-10 |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A process for the production of chloride free potassium phosphate fertilizer which comprises the steps of:
   (1) simultaneously introducing into a saturator a stream of solid potassium chloride and a stream of depleted brine solution, said brine solution recycled from a later-mentioned electrolytic cell;
   (2) removing from said saturator the resulting brine saturated with potassium chloride and introducing same into an electrolytic cell together with a stream of mercury, said mercury flowing in juxtaposition with the cathode portion thereof;
   (3) applying direct current across said electrolytic cell of voltage and amperage sufficient to electrolyze said saturated potassium chloride brine therein; removing gaseous chlorine therefrom formed at the anode thereof, returning the resulting depleted brine to said saturator, and removing the resulting mercury potassium amalgam formed at and in the mercury cathode therein;
   (4) introducing said amalgam removed from said electrolytic cell into a decomposer together with potassium phosphate solution recycled from a later-mentioned mixer; removing from said decomposer a stream of mercury stripped of potassium and recycling said mercury back to said electrolytic cell; offgassing from said decomposer the resulting hydrogen gas; and removing from said decomposer a stream of resulting potassium enriched water-depleted phosphate solution;
   (5) introducing said stream of potassium enriched water-depleted phosphate solution into a mixer, together with a stream of phosphoric acid and a stream of makeup water; and
   (6) removing from said mixer the resulting chloride-free potassium phosphate solution, a portion of which is recycled to said decomposer and the remainder of which is collected as product.

2. The process of claim 1 wherein at least a portion of the resulting potassium enriched material withdrawn from said mixer is introduced to filter means wherefrom is removed as solids a chloride-free potassium phosphate fertilizer first product and wherefrom is removed as liquid a chloride-free potassium phosphate solution, a portion of which solution is recycled to said decomposer and the remainder of which solution is collected as a second product.

3. The process of claim 1 wherein said saturator is operated in the temperature range from about 25° C. to about 65° C.

4. The process of claim 1 wherein said saturator is operated in the range from about 50° C. to about 60° C. and wherein said electrolytic cell is operated at a current density of about 0.1 A/cm.² to about 3.5 A/cm.².

5. The process of claim 3 wherein said saturator is operated at about 55° C, said decomposer is operated at about 35° C. to about 100° C., and said electrolytic cell is operated at a current density of about 0.2 A/cm.² to about 0.7 A/cm.².

References Cited

UNITED STATES PATENTS 3,681,214    8/1972    Iones cu et al. _____ 204—99

FOREIGN PATENTS

| 1,247,198 | 9/1971 | Great Britain. | |
| 772,226 | 4/1957 | Great Britain | 204—99 |
| 391,673 | 9/1965 | Switzerland | 240—99 |
| 1,266,289 | 4/1968 | Germany | 204—220 |
| 4,412,259 | 3/1969 | Japan | 204—99 |

SAMIH N. ZAHARNA, Primary Examiner

R. BARNES, Assistant Examiner

U.S. Cl. X.R.

204—99; 423—180, 309, 313

PO-1050
(5/69)

UNITED STATES PATENT OFFICE
CERTIFICATE OF CORRECTION

Patent No. 3,832,154    Dated August 27, 1974

Inventor(s) Travis P. Hignett and Anthony J. Smith

It is certified that error appears in the above-identified patent and that said Letters Patent are hereby corrected as shown below:

Column 1, line 58, change formula to: $[K_m H_{(n-m+2)} P_n O_{(3n+1)}] \cdot l H_2 O$ line 61, change formula to:

$$[m/2\ K_2O + n/2\ P_2O_5 + (n-m+2)/2\ H_2O] \cdot l H_2O$$

Column 2, line 48, before "concentration" insert -- a --
Column 3, line 37, change "particular" to -- particulate --
    line 62, change "precent" to -- percent --
Column 4, line 5, change "fround" to -- found --
Column 5, line 2, change "drain" to -- drained --; line 18, change "saurator" to -- saturator --; line 22, change "Clorine" to -- Chlorine --; line 23, change "amalgma" to -- amalgam --; line 28, change "decomposed" to -- decomposer --; line 67, change "decomposed" to -- decomposer --.
Column 6, line 35, change "electrically" to -- electricity -- line 20, "th" should be -- the --
Column 10, Table IV, under heading "Weight ratio, $K_2O:P_2O_5$" fourth figure should be -- 1.138 -- instead of 1,138; sixth figure should be -- 1.072 -- instead of 1,072; eighth figure should be -- 1.106 -- instead of 1,106.
Column 11, Table VIII, under heading "59-61% $K_2O$ granular Red" change the third item from 1.8-2.5 to -- 1.8-3.5 --

Signed and sealed this 19th day of November 1974.

(SEAL)
Attest:

McCOY M. GIBSON JR.
Attesting Officer

C. MARSHALL DANN
Commissioner of Patents